INVENTOR.
George W. Sadell,
BY
Paul & Paul
ATTORNEYS.

July 10, 1962  G. W. SADELL  3,043,071
PACKAGING MACHINE

Filed Feb. 29, 1960  2 Sheets-Sheet 2

INVENTOR.
George W. Sadell,
BY Paul & Paul
ATTORNEYS.

3,043,071
PACKAGING MACHINE

George W. Sadell, West Bristol, Pa., assignor to J. B. Dove & Sons, Inc., Philadelphia, Pa., a corporation of Pennsylvania
Filed Feb. 29, 1960, Ser. No. 11,841
1 Claim. (Cl. 53—390)

This invention relates to a packaging machine particularly useful in the packaging of fruits, vegetables, poultry and other items which, if wrapped, require a wrapping which is capable of "breathing."

Today, fruits, vegetables, meats, and many other products, are pre-wrapped in thin transparent heat-sealable plastic sheet or film. Such pre-wrapping has several advantages. First, pre-wrapping on a volume basis is less costly than individual wrapping of each article at the time of the particular sale. Secondly, pre-wrapping the products in thin transparent film makes them attractive in appearance and facilitates their ready sale.

For wrapping fruits, vegetables, meats, and other products, various types of transparent film have been employed which "breathe" to a certain extent, some to a greater extent than others. Pliofilm, a rubber hydrochloride produced and sold by the Goodyear Tire & Rubber Company in the form of transparent sheets or rolls of the order of 0.001 inch thick, is frequently used for wrapping, including fruits and vegetables. But Pliofilm has a low breathing characteristic, that is, it breathes at a relatively slow rate. However, Pliofilm is available in rolls in perforated form, and in such form is useful for wrapping fruits, vegetables and other products which require a high breathing wrapping. Vitafilm, a polyvinyl chloride produced by Goodyear Tire and Rubber Company in both extruded and cast forms, would be very useful in thin film form for wrapping of fruits, vegetables and the like, if it had sufficiently good breathing characteristics, since it is somewhat less costly than Pliofilm. Vitafilm has a high breathing characteristic compared with unperforated Pliofilm, but not as high as is required by fruits, vegetables and other articles which require fast breathing. Unlike Pliofilm, Vitafilm is not available in perforated film form. It has been found that if Vitafilm is perforated, it cannot be rerolled. The ability to reroll satisfactorily perforated Vitafilm is probably due to the fact that during the perforating operation the Vitafilm tends to stretch, but not uniformly across the width of the sheet, making rerolling difficult and unsatisfactory.

My present invention provides a machine capable of taking a supply roll of thin transparent heat-sealable plastic wrapping film, preferably but not necessarily Vitafilm, and perforating such film as it is pulled from the roll for use in packaging fruits, vegetables and other products. The machine of my present invention also provides means for heat severing the continuous film at any selected point, and for heat sealing the wrapping, thereby to provide a package which can "breathe" freely.

My invention will be better understood from a consideration of the following detailed description of a preferred embodiment taken together with the drawing in which.

Figure 1:
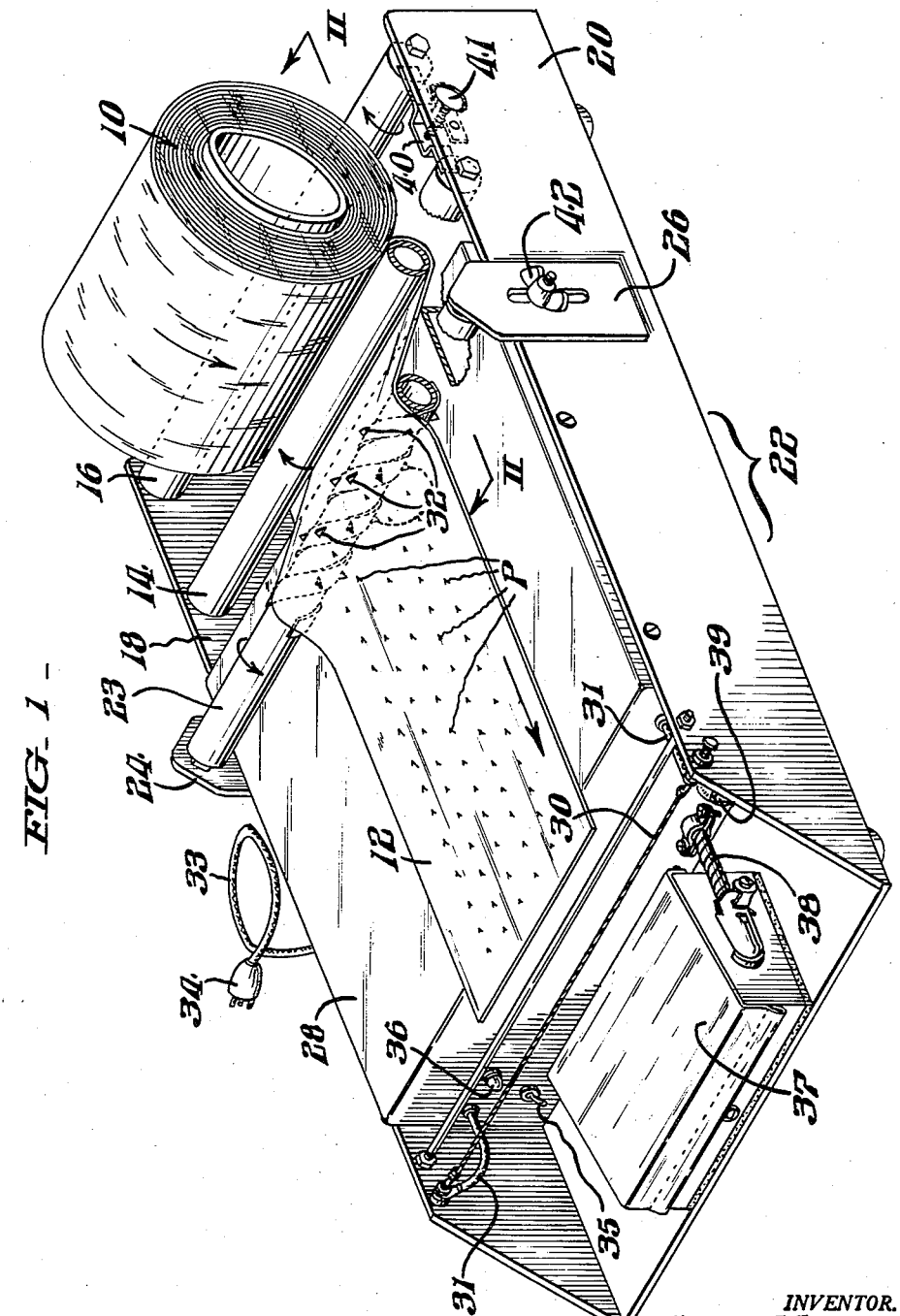
FIG. 1 is a perspective illustration of the complete machine according to my invention.

In describing the preferred embodiment of my invention illustrated in the drawing, specific terminology has been resorted to for the sake of clarity. However, it is not my intention to be limited to the specific terms so selected, and it is to be understood that each specific term includes all technical equivalents which operate in a similar manner to accomplish a similar purpose.

Referring now to the drawing, there is shown a supply roll 10 of continuous thin transparent heat-sealable plastic film 12, preferably Vitafilm but which may be Pliofilm, or polyethylene, or any other suitable wrapping material. The thickness of the film is ordinarily of the order of ½ mil to 2 mils, preferably about ¾ mil.

Roll 10 rests of its own weight on a pair of spaced apart rollers 14, 16 rotatably mounted in the sides 18, 20 of a box-like metal frame 22, preferably aluminum. The degree to which rollers 14, 16 are freely rotatable is controlled by an adjustable brake 40 which applies pressure equally to the ends of rollers 14, 16 under the control of adjustable thumb screw 41.

Figure 5:
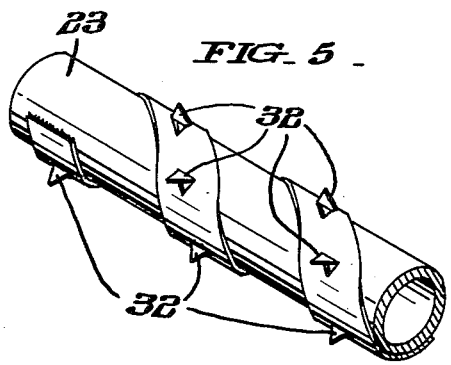
FIG. 5 is a view of a section of the perforating roller.
Figure 4:
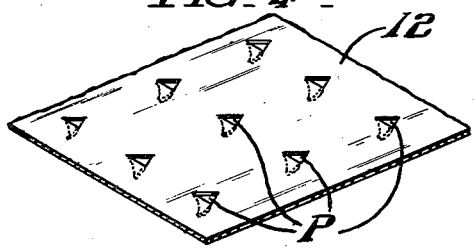
FIG. 4 shows the fragmentary piece of plastic film after perforation.

A perforating roller 23 is, in accordance with my present invention, mounted for free rotation in a pair of side brackets 24, 26 which extend above the work surface 28 of the frame 22 to an extent adjustable by wing nut 42. The center portion of the roller 23 is equipped with upstanding pointed teeth 32, preferably of triangular shape, which may be applied to roller 23 by means of a helical wrap as shown in detail in FIG. 5. Rollers 14, 16 and 23 are so positioned relative to each other and to the supply roll 10 that, in the operation of the machine, as the plastic transparent film 12 is pulled from the supply roll 10, the film passes in close contact with perforating roller 23 and perforations P are made in the center portion of the plastic film, as clearly shown in FIGS. 1 and 2.

Across the output end of the machine, a resistance element wire 30, preferably Nichrome, a nickel-chromium alloy wire produced by Driver-Harris Company, is provided for heat severing the continuous film at any desired point. Resistance element wire 30 is connected by leads 31, 31 to the secondary of a transformer (not shown) the primary of which is connected by way of cable 33 to plug 34. The transformer is a step-down transformer designed to step the supply voltage of 110-volts down to about 10-volts for application across the resistance element wire 30. When plug 34 is inserted in a 110-volt power socket (not shown) and the toggle switch 35 is thrown to the "on" position, sufficient current passes through the resistance element wire 30 to heat the element wire to a temperature (for example 400° F.) sufficient to effect instant severance of the plastic film 12 when the film is placed in contact with the wire 30. A lamp 36 indicates when the power is "on."

The machine is also provided at the output end with a hot plate 37 which is used for sealing the wrapping or package. The heating element (not shown) of hot plate 37 is connected, as by cable 38, switch 35, cable 33 and plug 34 to a 110-volt power source. An adjustable thermostat 39 is provided in the circuit for controlling the temperature of hot plate 37, a typical range of temperatures being from 150° to 550° F. Thermostat 39 also may be conveniently used for turning off the power to hot plate 37 while leaving the resistance element wire 30 energized. This is useful, for example, when the resistance element wire 30 is to be used for cutting the roll film into pieces of desired length, without wrapping anything at the time.

In a typical wrapping or packaging operation, the operator places a tray of fruit or vegetables, or whatever article is to be wrapped, on the perforated film which is already lying on the work surface 28 as a result of a prior wrapping operation such as is seen in FIG. 1.

In placing the article to be wrapped on the perforated film on work surface 28, the operator places it nearer to the perforating roll 23 than to the severing wire 30 so that she can pull the cut end of the perforated film up and over the article. She then lifts the article and tucks the end of the film thereunder. She next pulls the partially wrapped article forward along the work surface 28 and in so doing pulls film from the roll 10 which by reason of the perforating roller 23, is automatically perforated as it passes over the perforating roller. The operator continues to pull the article forward until it is above the hot plate 37 at which time she lowers it upon the hot plate. The taut film thereupon contacts the heating element wire 30 and is instantly severed thereacross. The operator then turns the package over 90° and seals the severed end of the film on the hot plate 37. She then completes the wrapping of the package by folding in the end portions, which extend out from either side, and heat sealing the wrapping.

In the operation of the machine, the tension-adjusting screw 41 is preferably so adjusted that when the film is pulled from the roll 10 the film tends to stretch, thus enlarging somewhat the perforations made in the film by the triangular teeth 32. The size of the teeth 32 on the perforating roller 23 may, of course, be larger or smaller, according to the need.

It is to be noted that preferably only the center area of the film is perforated. This is done in order not to weaken the strength of the film unnecessarily. The edge portions of the film do not ordinarily require perforating since, ordinarily at least, they are folded over in overlapping fashion in the wrapping of the article and any perforations made therein would tend to be covered up by non-perforated areas of the film.

Figure 2:
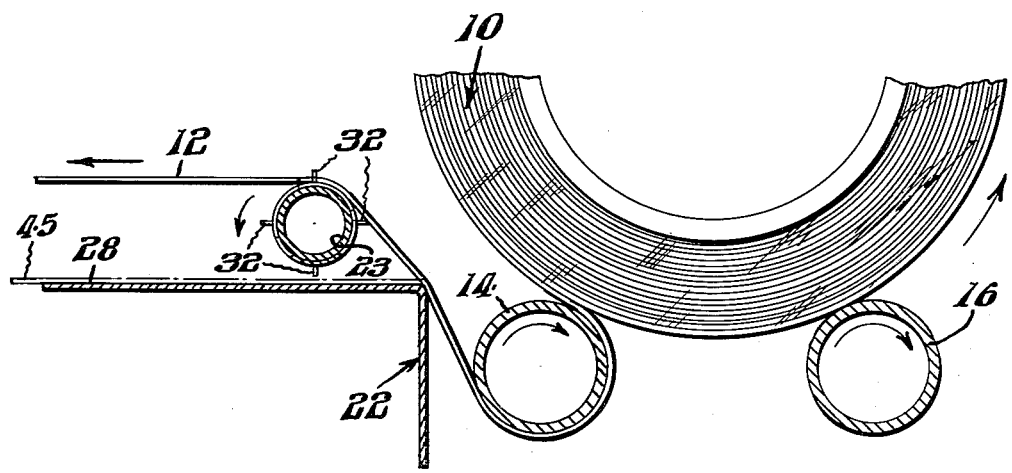
FIG. 2 is a fragmentary view along the line II—II of FIG. 1 showing the perforating roller in its position relative to the supporting rollers and the supply roll, and showing the path taken by the film during unrolling.
Figure 3:
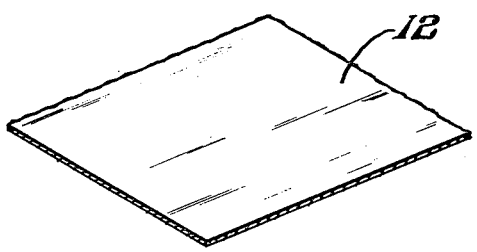
FIG. 3 is a showing of a fragmentary piece of plastic film before it is perforated.

Attention is also called to the fact that if it is desired for any reason to use non-perforated wrapping film, the film may be taken from the roll 10 along the path indicated in FIG. 2 by dot-and-dash line 45 in which case the film 12 passes beneath the perforating roller 23 along the work surface 28 and thus escapes perforation.

While the preferred embodiment of this invention has been described in some detail, it will be obvious to one skilled in the art that various modifications may be made without departing from the invention as hereinafter claimed.

Having thus described my invention, I claim:

A compact unitary portable machine for use in wrapping fruits, vegetables, and like products, requiring a plastic film wrapping which is capable of breathing, said machine comprising: a box-like metal frame having a work surface and having rotatably mounted beyond the rearward end of said work surface and substantially below the level thereof a pair of transverse spaced-apart support rollers for supporting peripherally a supply roll of thin unperforated transparent plastic film; a toothed perforating roller rotatably supported in said frame on an axis substantially parallel to the axes of said support rollers and of said supply roll, said support rollers and said perforating roller being mounted in such positions that said film may be passed downward in close contact with the rearward surface of one of said guide rollers to a point substanitally below the level of said work surface and then upward about and in close contact with said perforating roller, the central circumferential portion of said perforating roller being provided with a plurality of spaced-apart triangularly-shaped teeth, which protrude substantially from its periphery, whereby when said film is pulled forwardly from said supply roll, the central portion of said film is perforated, leaving both edge regions unperforated; an electric resistance wire mounted in transverse position forward of said work surface for heat-severing said film at any selected point; an electric hot plate mounted forward of said electric resistance wire for heat-sealing said severed film to form a package; and means for passing electric current selectively through either or both said resistance wire and said hot plate.

References Cited in the file of this patent

UNITED STATES PATENTS

| | | |
|---|---|---|
| 1,958,694 | Chandler | May 15, 1934 |
| 2,615,200 | Cloud | Oct. 28, 1952 |
| 2,668,403 | Rumsey | Feb. 9, 1954 |
| 2,690,633 | Denton | Oct. 5, 1954 |
| 2,699,208 | Schur | Jan. 11, 1955 |
| 2,842,910 | Reed | July 15, 1958 |
| 2,845,764 | Forry | Aug. 5, 1958 |
| 2,987,864 | Miller | June 13, 1961 |

FOREIGN PATENTS

| | | |
|---|---|---|
| 790,212 | Great Britain | Feb. 5, 1958 |

UNITED STATES PATENT OFFICE
CERTIFICATE OF CORRECTION

Patent No. 3,043,071                          July 10, 1962

George W. Sadell

It is hereby certified that error appears in the above numbered patent requiring correction and that the said Letters Patent should read as corrected below.

Column 1, line 44, for "ability" read -- inability --.

Signed and sealed this 30th day of October 1962.

(SEAL)
Attest:

ERNEST W. SWIDER
Attesting Officer

DAVID L. LADD
Commissioner of Patents